United States Patent
Gopalakrishna (10) Patent No.: US 9,881,435 B2
(45) Date of Patent: Jan. 30, 2018

(54) SITE BASED CLUSTERED ANTI-PASS BACK SECURITY SYSTEM AND METHOD

(71) Applicant: Honeywell International Inc., Morristown, NJ (US)

(72) Inventor: Rajesh Gopalakrishna, Sterling, VA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/798,760

(22) Filed: Jul. 14, 2015

(65) Prior Publication Data
US 2017/0018131 A1    Jan. 19, 2017

(51) Int. Cl.
*G07C 9/00* (2006.01)
*H04L 12/58* (2006.01)

(52) U.S. Cl.
CPC ..... *G07C 9/00309* (2013.01); *G07C 9/00007* (2013.01); *G07C 9/00103* (2013.01); *G07C 9/00166* (2013.01); G07C 2009/00341 (2013.01); G07C 2209/04 (2013.01); H04L 51/18 (2013.01)

(58) Field of Classification Search
None
See application file for complete search history.

(56) References Cited

U.S. PATENT DOCUMENTS

| 5,475,378 A | 12/1995 | Kaarsoo et al. |
| 7,624,432 B2 * | 11/2009 | Wood .................... G06F 21/335 713/163 |
| 8,009,013 B1 | 8/2011 | Hirschfeld et al. |
| 8,738,791 B1 * | 5/2014 | Martini .................. H04L 41/50 709/225 |
| 2013/0093563 A1 | 4/2013 | Adolfsson et al. |
| 2014/0075514 A1 | 3/2014 | Prasad et al. |

OTHER PUBLICATIONS

Extended European search report for corresponding EP patent application 16178263.6 dated Nov. 16, 2016.

* cited by examiner

*Primary Examiner* — Leon-Viet Nguyen
(74) *Attorney, Agent, or Firm* — Husch Blackwell LLP (57) ABSTRACT

Site based clustered APB security systems and methods are provided. Some systems can include a first plurality of access controllers located at a first site, a second plurality of access controllers located at a second site, and a host system supporting each of the first and second plurality of access controllers. A triggering event at a first of the first plurality of access controllers can cause the first of the first plurality of access controllers to transmit a triggering signal to the host system. Responsive thereto, the host system can identify the remaining access controllers in the first plurality of access controllers, transmit a status update to the remaining access controllers in the first plurality of access controllers, and avoid transmitting the status update to the second plurality of access controllers.

17 Claims, 6 Drawing Sheets

Table 1

| | Number of card swipes per sec | Number of APB status download generated/processed | Number of card swipes per sec | Number of APB status download generated/processed | | Number of card swipes per sec | Number of APB status download generated/processed |
|---|---|---|---|---|---|---|---|
| 2 APB Controllers | 1 | 1 | 5 | 4 | ... | 100 | 100 |
| 5 APB Controllers | 1 | 4 | 5 | 20 | ... | 100 | 400 |
| ... | | | | | | | |
| 100 APB Controllers | 1 | 99 | 5 | 400 (4*100) | ... | 100 | 9900 (99*100) |

*FIG. 4*

PRIOR ART

FIG. 5

Table 2

Comparison between downloads generated due to global APB verses SITE based APB, and reduction

| | Total Number of downloads generated by Host (with global-APB) | Total Number of downloads generated by Host (with site based clustered APB) | % Reduction in Downloads to controller |
|---|---|---|---|
| 1 card swipe on controller in SITE1 | 59 | 9 | 85% |
| 5 card swipe on controllers in SITE1 | 295 | 45 | 85% |
| 4 Card Swipes as shown below<br>• 1 card swipe on controller in SITE1<br>• 1 card swipe on controller in SITE2<br>• 1 card swipe on controller in SITE3<br>• 1 card swipe on controller in SITE4 | 236 | 56(9+4+14+29) | 76% |
| 10 Card Swipes as shown below<br>• 2 card swipes on controller in SITE1<br>• 2 card swipes on controller in SITE2<br>• 3 card swipes on controller in SITE3<br>• 3 card swipes on controller in SITE4 | 590 | 155(2x9 + 2x4 + 3x14 + 3x29) | 74% |

FIG. 6

SITE BASED CLUSTERED ANTI-PASS BACK SECURITY SYSTEM AND METHOD

FIELD

The present invention relates generally to security systems and methods. More particularly, the present invention relates to a site based clustered anti-pass back security system and method.

BACKGROUND

Many known access control systems include an anti-pass back (APB) feature that prevents unauthorized users from tailgating an authorized user to gain access to a secured region. For example, when a user presents a valid access card to a card reader to gain access to a secured region, an APB feature prevents an unauthorized second user from using the same card to gain access to the region. Such APB features can include designating different card readers as an IN reader or an OUT reader and controlling access to the secured region in accordance with three rules: (1) a user presenting a valid card to an IN reader must present the same card to an OUT reader before again presenting the card to an IN reader, (2) after presenting a valid card to an IN reader, a user presenting the same card to the same or another IN reader, without presenting the card to an OUT reader, will be disallowed access, and (3) after presenting a valid card to an OUT reader, a user presenting the same card to the same or another OUT reader, without presenting the card to an IN reader, will be disallowed access.

Figure 1:
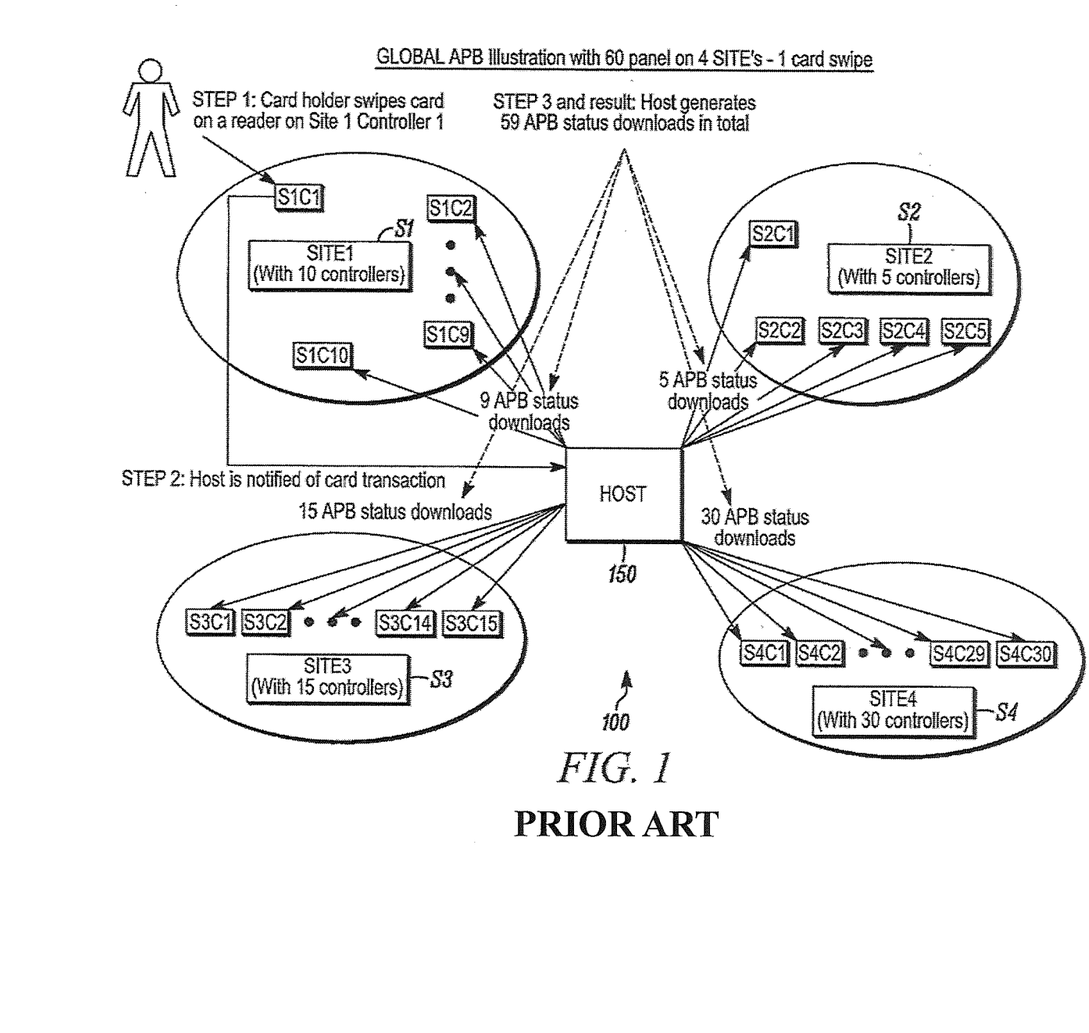
FIG. 1 is a block diagram of a known access control system that includes a global APB feature.

FIG. 1 is a block diagram of a known access control system 100 that includes an APB feature. As seen in FIG. 1, the system 100 can include four sites S1, S2, S3, and S4. The system 100 can also include one host system 150 that supports and communicates with access controllers at each of the sites S1, S2, S3, and S4. For example, the host system 150 can be any computer or device that is capable of transmitting an APB status update to an access controller.

Figure 2:
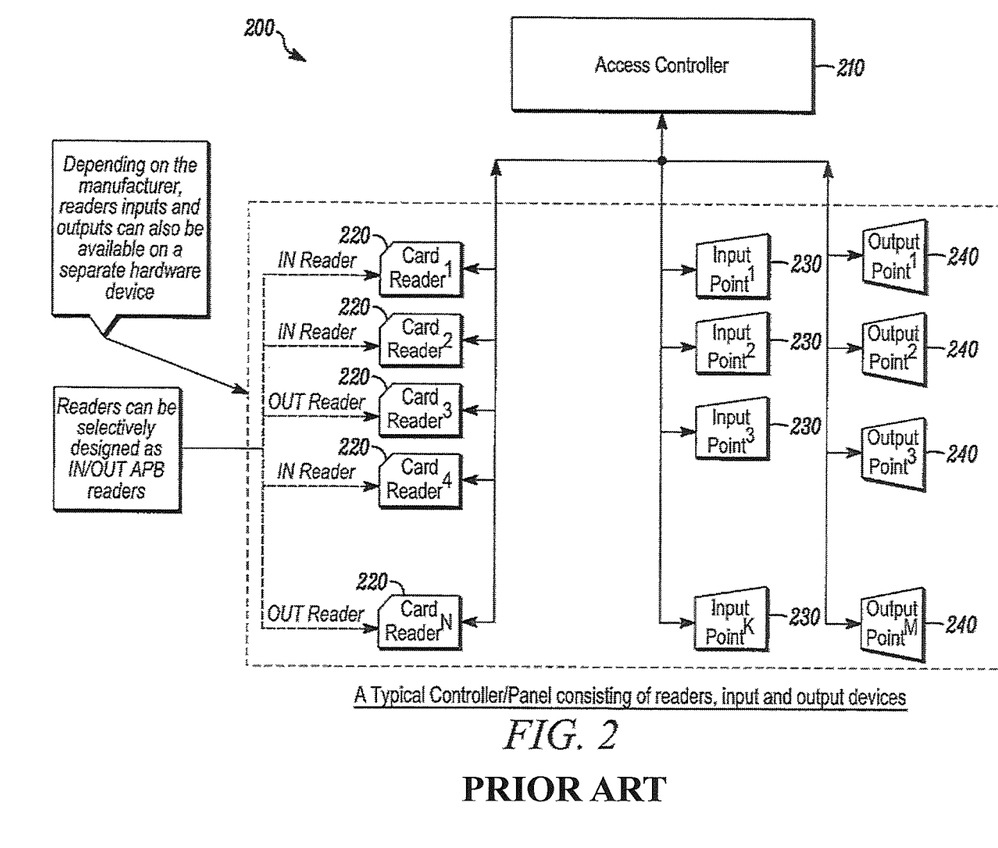
FIG. 2 is a block diagram of an access control system known in the art.

As seen in the exemplary system 100, Site 1 S1 can include 10 access controllers S1C1-S1C10, Site 2 S2 can include 5 access controllers S2C1-S2C5, Site 3 S3 can include 15 access controllers S3C1-S3C15, and Site 4 can include 30 access controllers S4C1-S4C30. Access controllers are known in the art. For example, as seen in FIG. 2, an access controller 210 can communicate with a plurality of card readers 220, a plurality of input devices 230, and a plurality of output devices 240.

When a valid card transaction occurs at a card reader in communication with one access controller, for example, access controller S1C1, the access controller S1C1 can transmit a corresponding triggering signal to the host system 150. It is to be understood that a triggering signal as used herein includes a signal transmitted from an access controller to a host system responsive to a valid card transaction occurring at a card reader in communication with the access controller. It is to be further understood that a valid card transaction is one that allows a user to gain access via a secured entryway by presenting a valid access card to a card reader. Upon receipt of the triggering signal from the access controller S1C1, the host system 150 can globally transmit or download an appropriate APB status update to all other access controllers in the system, including S1C2-S1C10, S2C1-S2C5, S3C1-S3C15, and S4C1-S4C30, so that each access controller can be updated for abiding by the APB rules described above.

Figure 3:
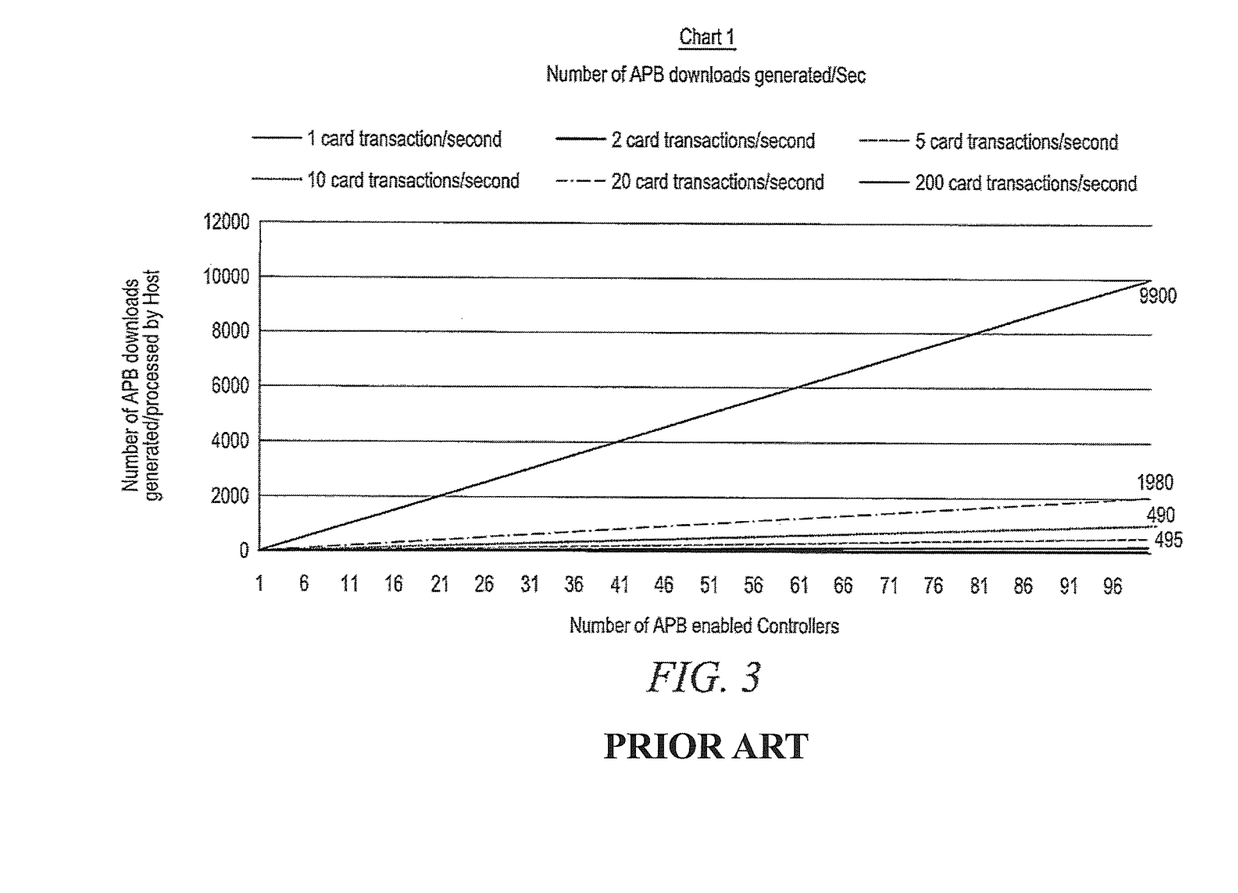
FIG. 3 is a chart illustrating the number of APB status updates downloaded per second in accordance with known systems and methods.
Figure 4:
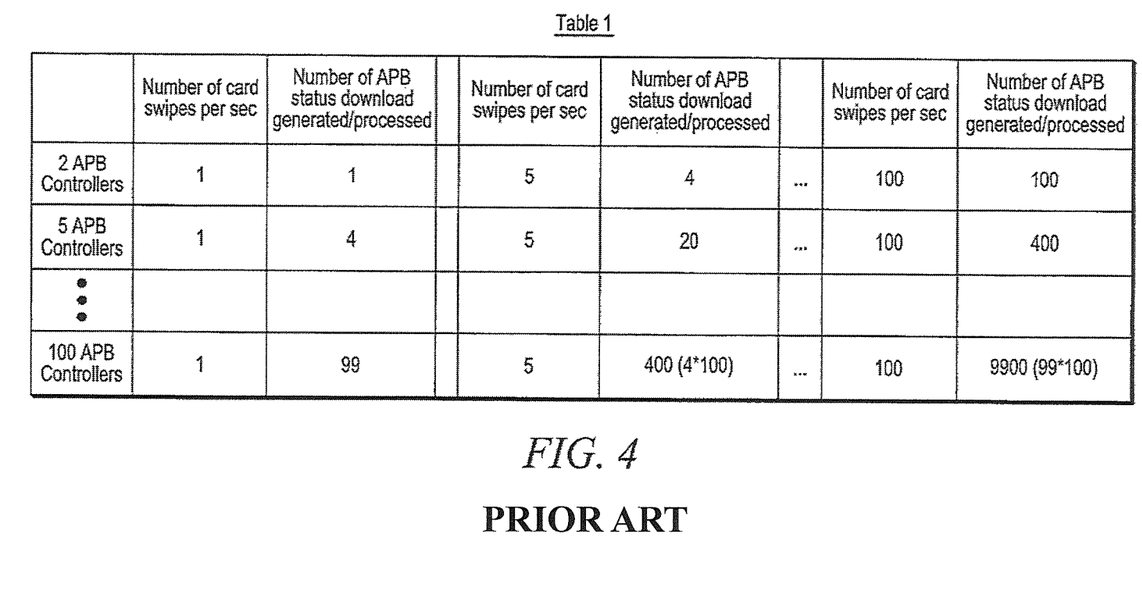
FIG. 4 is a graph illustrating the number of APB status updates downloaded per second in accordance with known systems and methods.

However, large secured facilities and regions can include thousands of card readers in communication with many access controllers, and the number of times the host system transmits an APB status update is controlled by the following factors: (1) the number of valid card transactions at all card readers in a secured region, and (2) the number of access controllers following APB rules. For example, a higher number of valid card transactions will cause a higher number of APB status updates to be transmitted by a host system, and a higher number of access controllers following APB rules will cause a higher number of APB status updates to be transmitted by a host system for each valid card transaction. Chart 1 in FIG. 3 and Table 1 in FIG. 4 are illustrative of these principals.

Indeed, in known systems, Equation (1) is explanatory:

$$\text{Total number of APB status updates downloaded per second} = (\text{Total number of APB access controllers communicating with a host system} - 1) \times \text{Total number of valid card transactions per second} \quad \text{Equation (1)}$$

It is to be understood that the total number of APB access controllers communicating with the host system is subtracted by 1 because the APB status update is not transmitted to the access controller that transmitted the triggering signal.

In accordance with the above, in the exemplary known access control system 100 in FIG. 1 with 60 access controllers, a valid card transaction occurring at a card reader in communication with one access controller S1C1 can result in the host system 150 downloading an APB status update 59 times.

The known systems and methods described above have several disadvantages. For example, when a large number of APB status updates are downloaded, big backlogs on both the host system and the access controllers can be created. Such backlogs can create functional and operational issues that are undesirable. For example, when a user enters a secured area via a first IN card reader supported by a first access controller, the user will not be able to exit the secured area via a second OUT card reader supported by a second access controller if the host system does not download and the second access controller does not receive an appropriate APB status update in a timely manner. Similar issues can arise during an emergency evacuation of the secured area. Indeed, a user may not be able to leave a compromised secured area to reach a safe area in a timely manner.

To alleviate some of the functional and operational issues described above that are caused by performance and throughput constraints, some known systems and methods have reduced the number of APB access controllers supported by a single host system. However, any such reduction leads to higher costs in maintaining the hardware, software, and support of additional host systems that are required to accommodate and support a large number of APB access controllers.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a site based clustered APB security system and method. For example, an access control system as disclosed herein can include a plurality of access controllers that can be grouped according to location, vicinity, or proximity. In some embodiments, access controllers, buildings, or facilities in a single geographical area, such as Europe, the UK, USA, Africa, the Middle East, or the like, can be grouped together. Additionally or alternatively, access controllers, buildings, or facilities in a single city, such as all facilities in Houston, can be grouped together. Additionally or alternatively, floors in a multi-level building can be placed in respective groups. Accordingly, a site as disclosed herein can include a group or cluster of access controllers based on proximity, region, or location.

Each group of access controllers can be considered to be in a respective site, and any access controller can transmit a triggering signal to a host system when a valid card transaction occurs at a card reader supported by the access controller. As explained above, it is to be understood that a triggering signal as used herein includes a signal transmitted from an access controller to a host system responsive to a valid card transaction occurring at a card reader in communication with the access controller. It is to be further understood that a valid card transaction is one that allows a user to gain access via a secured entryway by presenting a valid access card to a card reader.

When a host system receives a triggering signal from an access controller that triggers the downloading of an APB status update, the host system can transmit the APB status update to a subset of the access controllers that the host system supports instead of globally transmitting the APB status update to all of the access controllers that the host system supports. For example, in some embodiments, the host system can identify the access controller that transmitted the triggering signal, identify the site in which that access controller is located, and transmit the APB status update to all of the access controllers in that site only.

Systems and methods in accordance with disclosed embodiments can function in accordance with desired APB rules because a user presenting a card to an access controller in a first site will not, at the same time or within a predetermined period of time, be within physical proximity to an access controller in a second site. For example, a user that presents his card to an IN card reader in a Houston site cannot, at the same time or within a predetermined period of time, present his card to an OUT card reader in a Sacramento site. Therefore, when an access controller communicating with the IN card reader in the Houston site transmits a triggering signal to a host system to trigger the downloading of an APB status update, the host system will transmit or download the APB status update to access controllers in the Houston site and avoid transmitting or downloading the APB status update to access controllers in the Sacramento site.

In accordance with the above, Equation (2) and Equation (3) are explanatory:

$$\text{Total number of APB status updates downloaded per second} = ((\text{Total number of APB access controllers communicating with a host system at (Site 1)}-1) \times \text{Total number of valid card transactions per second at (Site 1)}) + ((\text{Total number of APB access controllers communicating with a host system at (Site 2)}-1) \times \text{Total number of valid card transactions per second at (Site 2)}) + \ldots (\text{Total number of APB access controllers communicating with a host system at (Site } N)-1) \times \text{Total number of valid card transactions per second at (Site } N)) \quad \text{Equation (2)}$$

$$\text{Total number of APB status updates downloaded per second} = \text{SUM} ((\text{Total number of APB access controllers communicating with a host system at (Site } i)-1) \times \text{Total number of valid card transactions per second at (Site } i)) \quad \text{Equation (3)}$$

Figure 5:
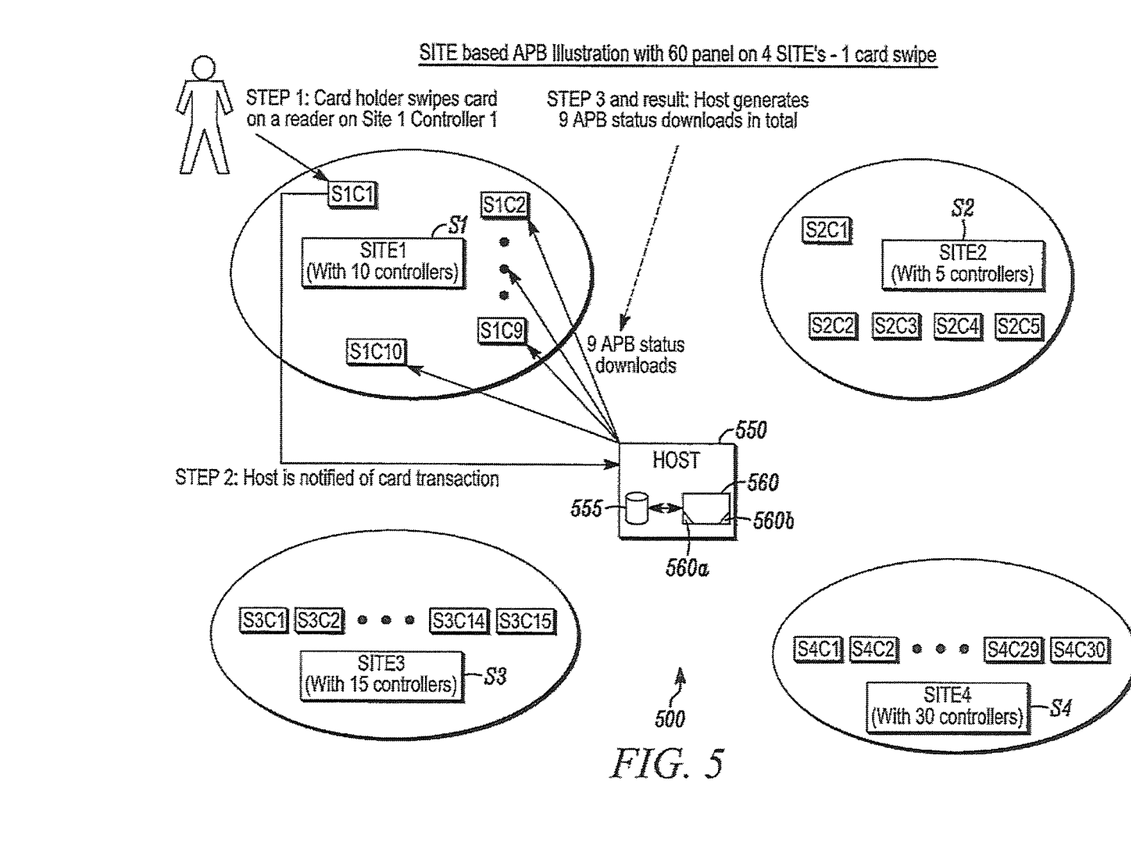
FIG. 5 is a block diagram of an access control system that includes an APB feature in accordance with disclosed embodiments.

In accordance with the above, FIG. 5 is a block diagram of an access control system 500 that includes an APB feature in accordance with disclosed embodiments. As seen in FIG. 5, the system 500 can include four sites S1, S2, S3, and S4 corresponding to Houston, Sacramento, Philadelphia, and Boston, respectively. The system 500 can also include one host system 550 that supports and communicates with access controllers at each of the sites S1, S2, S3, and S4. For example, the host system 550 can be any computer or device that is capable of transmitting an APB status update to an access controller.

As seen in the exemplary system 500, Site 1 S1 can include 10 access controllers S1C1-S1C10, Site 2 S2 can include 5 access controllers S2C1-S2C5, Site 3 S3 can include 15 access controllers S3C1-S3C15, and Site 4 can include 30 access controllers S4C1-S4C30. When a valid card transaction occurs at a card reader in communication with one access controller, for example, access controller S1C1, the access controller S1C1 can transmit a corresponding triggering signal to the host system 550. Upon receipt of the triggering signal from the access controller S1C1, the host system 550 can identify the site S1 in which the access controller S1C1 is located and can transmit or download an appropriate APB status update to the other access controllers S1C2-S1C10 in the same site S1. In this manner, all of the access controllers S1C1-S1C10 at the site S1 can be updated for abiding by the APB rules described above.

Figure 6:
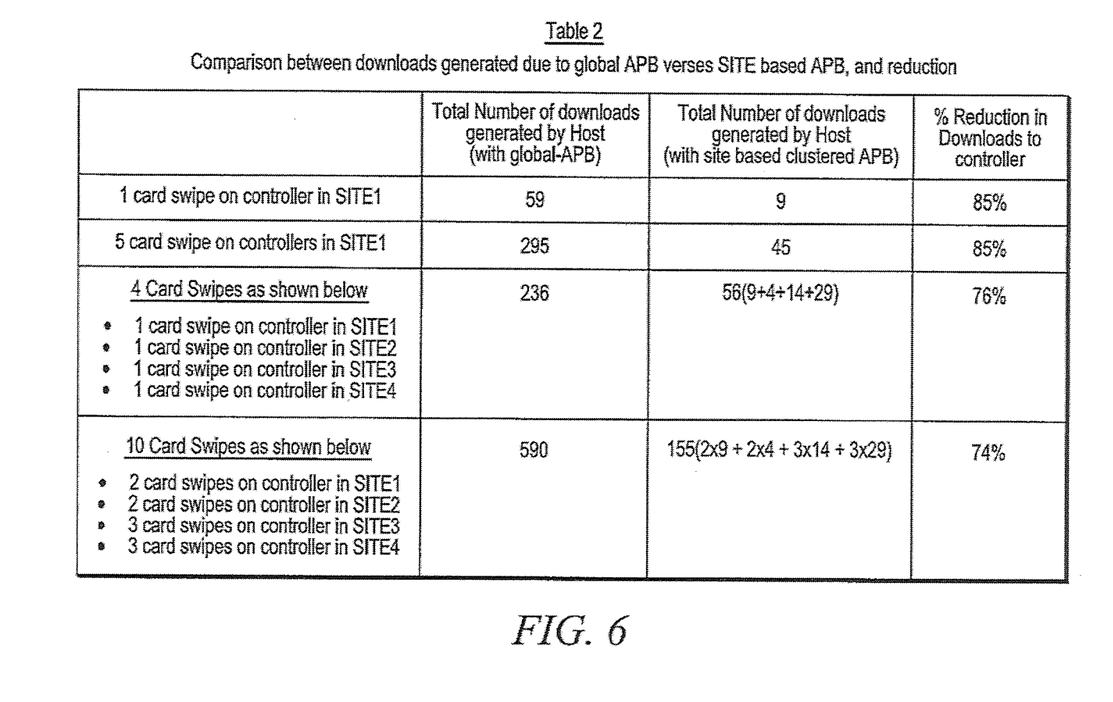
FIG. 6 is a graph illustrating the number of APB status updates downloaded per second in accordance with disclosed embodiments.

However, the host system 550 need not transmit or download the APB status update to the access controller S1C1 that transmitted the triggering signal or to the access controllers S2C1-S2C5, S3C1-S3C15, S4C1-S4C30 at the other sites S2, S3, and S4. Accordingly, in the exemplary access control system 500 of FIG. 5 with 60 access controllers, a valid card transaction occurring at a card reader in communication with one access controller S1C1 at one site S1 can result in the host system 550 transmitting or downloading an APB status update only 9 times. Table 2 in FIG. 6 is illustrative of this principal and quantifies the reduction in the number of APB status updates transmitted or downloaded in systems and methods disclosed herein as compared to the number of APB status updates transmitted or downloaded in known systems and methods.

In accordance with the above, the host system 550 can include a memory device 555, control circuitry 560, one or more programmable processors 560a, and executable control software 560b as would be understood by one of ordinary skill in the art. The executable control software 560b can be stored on a transitory or non-transitory computer readable medium, including, but not limited to local computer memory, RAM, optical storage media, magnetic storage media, and the like. In some embodiments, the control circuitry 560, the programmable processor 560a, and the executable control software 560b can execute and control the methods as described above and herein.

The memory device 555 disclosed herein can include a hard disk drive, RAM, or any other memory device as would be understood by one of ordinary skill in the art. Further, the memory device 555 can include a database that identifies each site supported by the host system 550, each APB access controller supported by the host system 550, the site at which each APB access controller is located, and the APB status for all APB access controllers and sites supported by the host system 550.

When the host system 550 receives a triggering signal from a first APB access controller, the control circuitry 560, the programmable processor 560a, and the executable control software 560b can access the memory device 555 to update the database with APB status information in the triggering signal. The control circuitry 560, the programmable processor 560a, and the executable control software 560b can also access the memory device 555 to determine, from the database, a first site at which the first APB access controller is located and to determine, from the database, a plurality of other APB access controllers located at the same first site. Additionally or alternatively, the control circuitry 560, the programmable processor 560a, and the executable control software 560b can determine the first site at which the first APB access controller is located from the triggering signal itself. In any embodiment, the host system 550 can retrieve an APB status update from the database and transmit, via a transceiver, the APB status update to the plurality of other APB access controllers located at the first site, thereby transmitting or downloading the APB status update thereto.

The systems and methods described above can provide many benefits and advantages as compared to known systems and methods. For example, embodiments disclosed herein can provide a competitive advantage in the marketplace because a single host system can support a higher number of access controllers while reducing throughput constraints and network traffic, thereby achieving improved performance for the host system and providing an improved return on investment and scalability for existing hardware resources. Furthermore, host systems in accordance disclosed embodiments can be used in connection with access controllers known in the art, previously installed in a facility, and manufactured by different companies.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a plurality of access controllers, wherein each of the plurality of access controllers is located at a respective one of a plurality of sites; and
a host system supporting each of the plurality of access controllers,
wherein a triggering event at a first of the plurality of access controllers causes the first of the plurality of access controllers to transmit a triggering signal to the host system,
wherein the host system receiving the triggering signal causes the host system to identify a first site of the plurality of sites at which the first of the plurality of access controllers is located and, based on identifying the first site of the plurality of sites, identify a sub-set of the plurality of access controllers associated with the first site of the plurality of sites,
wherein the sub-set of the plurality of access controllers includes a second of the plurality of access controllers located at the first site of the plurality of sites,
wherein the host system receiving the triggering signal causes the host system to transmit a status update to the sub-set of the plurality of access controllers, and
wherein the host system receiving the triggering signal causes the host system to avoid transmitting the status update to each of the plurality of access controllers outside of the sub-set of the plurality of access controllers and not associated with the first site of the plurality of sites.

2. The system of claim 1 wherein each of the sub-set of the plurality of access controllers is located at the first site of the plurality of sites, and wherein each of the plurality of access controllers outside of the sub-set of the plurality of access controllers is located at another of the plurality of sites other than the first site of the plurality of sites.

3. The system of claim 2 wherein the first of the plurality of access controllers is located at the first site of the plurality of sites.

4. The system of claim 1 wherein each of the plurality of access controllers is in communication with a respective card reader.

5. The system of claim 4 wherein the respective card reader in communication with each of the plurality of access controllers includes a respective anti-pass back compatible card reader.

6. The system of claim 5 wherein the triggering event includes a valid card transaction occurring at the respective anti-pass back compatible card reader in communication with the first of the plurality of access controllers.

7. The system of claim 6 wherein the status update includes an anti-pass back status update.

8. A system comprising:
a transceiver;
a memory device;
a programmable processor; and
executable control software stored on a non-transitory computer readable medium,
wherein the memory device identifies a plurality of access controllers and a respective site of a plurality of sites at which each of the plurality of access controllers is located,
wherein, upon receiving a triggering signal from a first of the plurality of access controllers, via the transceiver, the programmable processor and the executable control software access the memory device to identify a first site of the plurality of sites at which the first of the plurality of access controllers is located, wherein, upon receiving the triggering signal from the first of the plurality of access controllers, via the transceiver, and based on identifying the first site of the plurality of sites, the programmable processor and the executable control software access the memory device to identify a sub-set of the plurality of access controllers that are located at the first site of the plurality of sites, wherein the sub-set of the plurality of access controllers includes a second of the plurality of access controllers located at the first site of the plurality of sites, wherein the programmable processor and the executable control software transmit, via the transceiver, a status update to the sub-set of the plurality of access controllers, and wherein the programmable processor and the executable control software avoid transmitting the status update to each of the plurality of access controllers outside of the sub-set of the plurality of access controllers and not associated with the first site of the plurality of sites.

9. The system of claim 8 wherein the memory device identifies a respective anti-pass back status for each of the plurality of access controllers, wherein, upon receiving the triggering signal, the programmable processor and the executable control software update the respective anti-pass back status of at least some of the plurality of access controllers in the memory device, and wherein the programmable processor and the executable control software retrieve the respective anti-pass back status of the at least some of the plurality of access controllers as updated from the memory device.

10. A method comprising:
providing a host system supporting a plurality of access controllers with each of the plurality of access controllers located at a respective one of a plurality of sites;
the host system receiving a triggering signal from a first of the plurality of access controllers responsive to a triggering event at the first of the plurality of access controllers;
identifying a first site of the plurality of sites at which the first of the plurality of access controllers is located;
based on identifying the first site of the plurality of sites, identifying a sub-set of the plurality of access controllers associated with the first site of the plurality of sites, wherein the sub-set of the plurality of access controllers includes a second of the plurality of access controllers located at the first site of the plurality of sites;
the host system transmitting a status update to the sub-set of the plurality of access controllers; and
the host system avoiding transmission of the status update to each of the plurality of access controllers outside of the sub-set of the plurality of access controllers and not associated with the first site of the plurality of sites.

11. The method of claim 10 wherein each of the sub-set of the plurality of access controllers is located at the first site of the plurality of sites, and wherein each of the plurality of access controllers outside of the sub-set of the plurality of access controllers is located at another of the plurality of sites other than the first site of the plurality of sites.

12. The method of claim 11 wherein the first of the plurality of access controllers is located at the first site of the plurality of sites.

13. The method of claim 10 wherein each of the plurality of access controllers is in communication with a respective card reader.

14. The method of claim 13 wherein the respective card reader in communication with each of the plurality of access controllers includes a respective anti-pass back compatible card reader.

15. The method of claim 14 wherein the triggering event includes a valid card transaction occurring at the respective anti-pass back compatible card reader in communication with the first of the plurality of access controllers.

16. The method of claim 15 wherein the status update includes an anti-pass back status update.

17. The method of claim 10 wherein identifying the sub-set of the plurality of access controllers associated with the first site of the plurality of sites includes accessing a memory device to identify the sub-set of the plurality of access controllers that are located at the first site of the plurality of sites.

* * * * *